United States Patent Office 2,711,525
Patented June 21, 1955

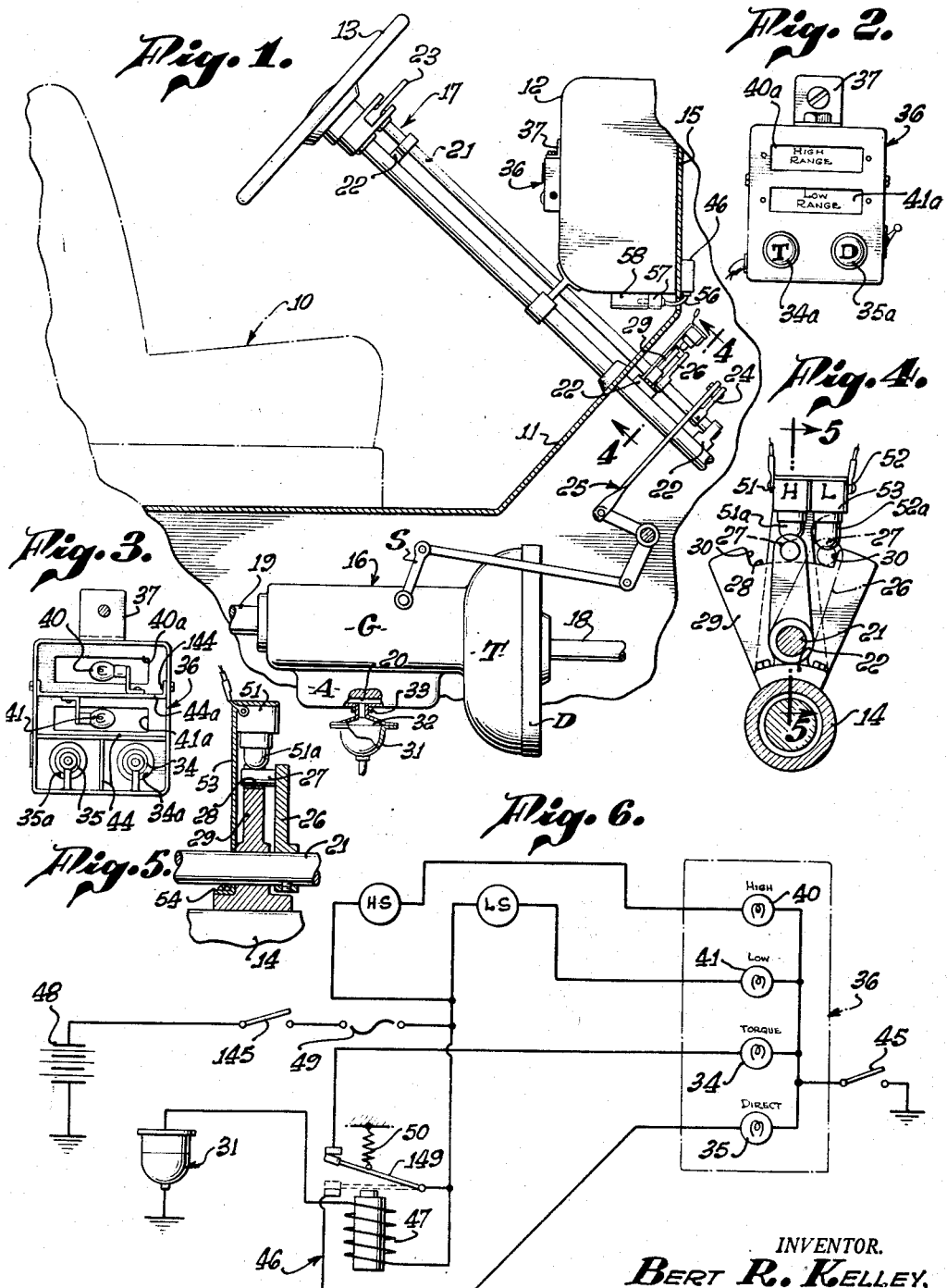

2,711,525

AUTOMATIC TRANSMISSION INDICATING APPARATUS

Bert R. Kelley, Glendale, Calif.

Application July 7, 1952, Serial No. 297,535

3 Claims. (Cl. 340—52)

This invention relates to motor vehicles of the type having automatic transmissions, and particularly to apparatus for indicating to a driver of such a vehicle the condition in which the automatic transmission is operating at a particular instant.

Salesmen of automobiles having automatic transmissions have in the past found great difficulty in explaining to a customer during a demonstration drive exactly when the transmission automatically converts from one operating condition to another. While the customer usually desires to know how the transmission operates, he often has a non-technical background which makes it very hard to explain in a satisfactory way just what operating conditions do prevail under different circumstances. This explanation becomes especially difficult when the transmission is of the type acting in one condition to transmit the driving power through fluid and in a second condition to transmit power through a non-fluid non-slip "direct" type drive. Further complexity is introduced in many transmissions by the fact that the transmission is actuable within either a high speed range or a low speed range, and in each of these ranges converts back and forth between the fluid and direct drive conditions at speeds varying widely under different operating circumstances.

The general object of the present invention is to provide a vehicle to be used for demonstration purposes which includes an automatic fluid-direct type transmission, and in which means are provided for positively indicating to a driver the operating conditions of the transmission. In particular, the present apparatus indicates to the driver, preferably visually, just when the transmission converts from its accelerating fluid drive condition to its "direct" drive condition, so that the operator is given a good overall picture of the manner of operation of the transmission. Also, an indication of the speed range is desirably given, to show the driver dramatically that the automatic fluid to direct conversion occurs in both speed ranges. The indicator may be of an electrically energized character, and preferably comprises indicator lights which automatically turn on in the various transmission conditions.

The fluid to direct drive indication may be controlled by an electric switch which is actuable in response to conversion of the transmission between its fluid and direct drive conditions. For most effective and reliable operation, combined with maximum structural simplicity, I find it desirable to employ for this purpose a pressure responsive switch, which is actuable by variations in pressure within a direct drive control passage in the transmission.

The transmission is manually actuable between its high and low speed range conditions by movement of a rod which extends along the steering column. In the present apparatus, the speed range indicating means are desirably controlled by means mounted to the steering column and actuable by means carried by the adjacent transmission control rod. This control may be effected by one or a pair of electric switches mounted to the steering column by a suitable bracket and actuable by a swinging arm carried by the rod.

While it is contemplated broadly that the indicating apparatus may be installed in a demonstration vehicle as original equipment, certain particular features of the invention have to do with a form of the apparatus which is especially designed for use as an accessory, to be applied to a vehicle after it has left the factory. This accessory arrangement includes an indicator housing which is removably attachable to the dash board of the vehicle within sight of an operator and contains the indicator means for indicating both the fluid-direct conversion and the speed range condition.

The above and other features and objects of the present invention will be better understood from the following detailed description of the typical embodiment illustrated in the accompanying drawing, in which:

Fig. 1 is a fragmentary side view of the driver's compartment and surrounding area of an automobile or other motor vehicle embodying the invention;

Figs. 2 and 3 are front and rear views respectively of the indicator box included in the apparatus of Fig. 1;

Fig. 4 is an enlarged partially sectional view taken on line 4—4 of Fig. 1;

Fig. 5 is a section taken on line 5—5 of Fig. 4; and

Fig. 6 is a diagrammatic representation of the electric circuit for the apparatus.

The vehicle shown fragmentarily in Fig. 1 is of essentially conventional construction, including the usual driver's seat 10, floor board 11, dash board 12, steering wheel 13, and steering column 14. The driver's compartment is separated from the forward engine compartment by a vertical partition or "fire wall" 15.

Beneath the floor board is an automatic transmission unit 16, which is controlled by the driver by control mechanism 17 mounted to the steering column. An indicator box 36, removably mounted to the dash board, is controlled by a pressure switch 31 at the underside of the transmission, and by a pair of switches 51 and 52 on the steering column, in a manner to indicate to a driver of the vehicle the various operating conditions of the transmission.

The transmission is of a conventional construction, including a torque converter typically represented at T, and a "direct" drive clutch D, each of which, under certain operating conditions, acts to transmit vehicle driving power from engine shaft 18 to the rear wheel actuating drive shaft 19. As will be understood, when only the torque converter is in operation and is serving as the effective power transmitting element, the driving power is transmitted from shaft 18 to shaft 19 through a hydraulic transmission fluid, which of course introduces some slippage and power loss into the system. When the "direct" drive D is in effect, on the other hand, fluid is not employed as the power transmitting medium, and there is consequently no slippage in the drive between shafts 18 and 19. In this connection, it is noted that the term "direct drive" as used in the present specification and claims is to be given its conventional and well understood meaning as denoting such a non-fluid, non-slip transmission. This direct drive preferably comprises a mechanical clutch acting to mechanically drive one shaft from the other.

During operation of the vehicle, the transmission automatically and repeatedly converts between torque and direct drive conditions in accordance with whatever driving conditions may be encountered. For instance, during acceleration of the vehicle, the torque converter T usually acts alone as the power transmitting means, while upon attainment of a desired driving speed, the direct drive clutch D comes into effect. Such automatic conversion of the transmission between torque and direct drive conditions is effected by automatic control apparatus contained within the transmission and designated typically in Fig. 1 by the letter A. For present purposes, it will suffice to describe this automatic control apparatus generally as comprising hydraulically actuated mechanism having among other parts means forming a direct drive control passage 20, containing a hydraulic fluid which acts to communicate to the direct drive D a variable control pressure. This pressure is approximately zero when the torque converter is acting as the power transmitting unit, and then automatically rises to a substantial value, say about 35 p. s. i., when the direct drive clutch D is to become effective. The increased pressure acts against clutch D to actuate it to an active condition.

In addition to the components already discussed, transmission 16 includes a gear box G, containing an assembly of control gears, which act to transmit power between the torque converter T or direct drive clutch D and drive shaft 18, and are manually actuable between several different operating conditions. This gear assembly is controlled by movement of a control arm S on the transmission, which has different settings for (1) forward driving within a high speed range (designated a "drive" range in some transmissions), (2) forward driving within a low speed range, (3) reverse driving, (4) parking, and (5) neutral. The driver actuates arm S by means of conventional control mechanism 17 mounted on the steering column, which mechanism includes a rod 21 mounted for rotary movement by means of bearings 22 attached to steering column 14. Rod 21 is given a transmission actuating rotary motion by means of a rigidly carried lever 23, while the rotary motion of the rod is in turn transmitted to arm S of the transmission by a rod carried swinging arm 24 and linkage 25.

For preventing accidental movement of rod 21 to parking and reverse positions, the rod carries a second arm 26, which prevents rotary movement of the rod beyond a predetermined point in each direction unless the rod is first moved axially downwardly a short distance. For this purpose arm 26 carries a pin 27 which projects toward the steering wheel and is receivable within an arcuate notch or recess 28 in the upper side of a plate 29 carried by one of the rod mounting bearings 22. The rod is adjustable to high speed range, low speed range and neutral positions, while pin 27 is contained within recess 28, but can not be rotated farther to parking or reverse positions until the rod is moved axially downwardly to an extent withdrawing pin 27 from within the recess to be free for movement laterally beyond the sides 30 of the recess.

All of the apparatus described above is conventional and well known in the art. I will now proceed to describe specifically the portion of the apparatus which is unique to the present invention.

Into the bottom of automatic control section A of the transmission, I threadedly connect the fluid pressure responsive electric switch 31, which contains a diaphragm 32 actuable by pressure fluid to open and close an electric circuit. This switch is connected into the usual threaded direct drive pressure take-off fitting 33 of the transmission, to communicate with direct drive actuating passage 20 and subject the diaphragm to the variable pressure in that chamber. The switch is set to open under the pressure which exists in passage 20 when torque converter T is in use (usually about zero p. s. i.), and closes upon the rise in pressure associated with actuation of direct drive clutch D to active condition. To illustrate typical operating conditions for the transmission and switch, the pressure within passage 20 may rise from about 0 p. s. i. to about 35 p. s. i. at the time of actuation of clutch D to active condition, in which case the switch may be operable at an intermediate pressure such as 15 p. s. i.

The opening and closing of pressure switch 31 controls the energization of a pair of indicator lights 34 and 35 contained within the indicator housing or box 36 mounted to the dashboard. This housing may typically be attached to the dashboard by a suitable angle bracket 37. The forward side of the housing contains a pair of lower translucent windows 34a and 35a which are illuminated by lights 34 and 35 respectively, and a pair of upper translucent windows 40a and 41a illuminated by a pair of lights 40 and 41 later to be discussed. Windows 34a and 35a carry the letters T and D, representing torque drive and direct drive respectively, while windows 40a and 41a carry the markings "High Range" and "Low Range," referring to the two speed ranges of the transmission. As seen in Fig. 3, the housing contains a number of opaque partitions 44, which assure that each light will illuminate only one of the front windows. An upper horizontal one of these partitions, designated 44a, may be removably attached to the housing, as by screws 144 at its opposite ends, and may carry the upper two indicator lights 40 and 41, so that these lights and the partition are removable from the housing as a unit for repair. A toggle switch 45 is mounted to a side of housing 36 and is connected into the ground circuit to all of the lights 34, 35, 40 and 41, to permit all of the lights to be deenergized if desired.

Pressure switch 31 actuates lights 34 and 35 through a double contact relay 46, which is mounted to the forward side of fire wall 5. As seen in the circuit diagram of Fig. 6, the coil 47 of this relay is connected into a circuit including the car battery 48, pressure switch 31, ignition switch 145, and a fuse 49. When the relay coil 47 is energized, by actuation of the transmission to direct drive condition, arm 149 of the relay is actuated to its broken-line position, in which it closes an energizing circuit from the car battery to light 35. When the coil is deenergized, by opening of switch 31 upon actuation of the transmission to torque drive condition, arm 149 of the relay is pulled by spring 50 to its full-line position, in which it opens the circuit to light 35 and closes an energizing circuit to light 34.

The high and low range indicating lights 40 and 41 are controlled respectively by a pair of electric micro-switches 51 and 52, which are mounted to the steering column 14 at a location to be engaged and actuated by pin 27 on arm 26. As seen in Fig. 4, the actuating stem 51a of switch 51 is engaged by pin 27 to close switch 51 when the pin is in its full-line Fig. 4 position (in which the transmission is in its high speed range condition), while actuating stem 52a of switch 52 is engaged to close that switch when the pin is in its broken-line low speed range position. When each switch is closed, it completes an energizing circuit to a corresponding one of the lights 40 or 41, to indicate that the transmission is in either high or low speed range as the case may be. Switches 51 and 52 may be mounted to steering column 14 by means of a bracket 53 positioned adjacent stop plate 29, and having an inner flange 54 attached to one of the bearings 22, and an outer flange 55 to which the switches are mounted.

To facilitate removal of indicator box 36 from the vehicle for repair or replacement, I preferably employ a releasable plug and socket type electrical connection between the box and the other pieces of apparatus. This connection may include a five-wire cord 56 leading from the box and carrying a five-prong plug 57 which is removably connectable into a five-recess socket 58 mounted at the underside of the dashboard.

In placing the apparatus in use, the various parts are mounted and connected as shown, and switch 45 is then turned on to energize the indicator apparatus. The vehicle is then driven in the usual manner, and the various lights 34, 35, 40 and 41 act tot indicate at all times the condition of the automatic transmission 16. That is, when the driver moves lever 23 to either a low or high speed range condition, the corresponding light in box 36 is energized to indicate the condition. As the vehicle is then driven in the selected range, lights 34 and 35 act to indicate exactly when the transmission is in torque and direct drive conditions respectively. The driver is thus given a dramatic and continuing overall picture of the condition of the transmission, to facilitate his understanding of the manner in which it operates.

I claim:

1. In a motor vehicle, an automatic transmission automatically convertible between fluid drive and direct drive conditions and having a fluid passage within which the pressure changes upon actuation of the transmission between said conditions, a pressure responsive electric switch actuable by said change in pressure, and an electrically energized indicator positioned to be viewed by a driver of the vehicle and operable by said switch to indicate said change of transmission conditions.

2. In a motor vehicle, an automatic transmission automatically convertible between torque converter and direct drive conditions and having a direct drive control passage containing fluid and within which the fluid pressure is increased upon actuation of the transmission to said direct drive condition, a pressure responsive electric switch subjected to the pressure of the fluid in said passage and actuable by said increase in pressure, and an electrically energized indicator positioned to be viewed by a driver of the vehicle and operable by said switch to indicate the actuation of said transmission to direct drive condition.

3. In a motor vehicle, an automatic transmission automatically convertible between torque converter and direct drive conditions and having a direct drive control passage containing fluid and within which the fluid pressure is increased upon actuation of the transmission to said direct drive condition, a pressure responsive electric switch subjected to the pressure of the fluid in said passage and actuable by said increase in pressure, a relay actuable by said switch, and a pair of indicator lights positioned to be viewed by a driver of the vehicle and controlled by said relay to indicate the conversion of said transmission to said torque converter and direct drive conditions respectively.

References Cited in the file of this patent
UNITED STATES PATENTS

| | | |
|---|---|---|
| 1,895,260 | Treese | Jan. 24, 1933 |
| 2,060,705 | Velo | Nov. 10, 1936 |
| 2,187,831 | Lange | Jan. 23, 1940 |
| 2,375,654 | Howell | May 8, 1945 |
| 2,489,617 | Byram | Nov. 29, 1949 |